(12) United States Patent
Cao et al.

(10) Patent No.: US 10,394,081 B2
(45) Date of Patent: Aug. 27, 2019

(54) DISPLAY SUBSTRATE AND MANUFACTURING METHOD THEREOF, AND DISPLAY PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Chengying Cao, Beijing (CN); Yi Wang, Beijing (CN); Jideng Zhou, Beijing (CN); Wei Feng, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 65 days.

(21) Appl. No.: 15/147,448

(22) Filed: May 5, 2016

(65) Prior Publication Data

US 2017/0038617 A1    Feb. 9, 2017

(30) Foreign Application Priority Data

Aug. 6, 2015    (CN) .......................... 2015 1 0477669

(51) Int. Cl.
*G02F 1/1333* (2006.01)
*G02F 1/1335* (2006.01)
(Continued)

(52) U.S. Cl.
CPC ........ *G02F 1/1337* (2013.01); *G02F 1/13394* (2013.01); *G02F 1/133512* (2013.01);
(Continued)

(58) Field of Classification Search
CPC ........ G02F 1/1303–1313; G02F 2001/133354; G03F 7/70616–70683
See application file for complete search history.

(56) References Cited

U.S. PATENT DOCUMENTS

| 5,783,289 A | * | 7/1998 | Suzuki | G02F 1/1333 |
| | | | | 349/158 |
| 5,985,359 A | * | 11/1999 | Jeung | G02F 1/1333 |
| | | | | 427/162 |
| 2004/0263771 A1 | * | 12/2004 | Jeong | G02F 1/133351 |
| | | | | 349/187 |

FOREIGN PATENT DOCUMENTS

JP        2010026369 A  *  2/2010

* cited by examiner

*Primary Examiner* — Mariceli Santiago
(74) *Attorney, Agent, or Firm* — Nath, Goldberg & Meyer; Joshua B. Goldberg

(57) ABSTRACT

The present invention provides a display substrate and a manufacturing method thereof and a display panel. The display substrate comprises a plurality of sub-substrates, distance measuring regions are provided on a base in space regions between the sub-substrates, the distance measuring region is configured to measure a distance between a mask plate and the base before forming each layer in the sub-substrates by using an exposure process, wherein a peripheral area of the distance measuring region is provided therein with a supporting layer on the base, the peripheral area is located in the space region and around the distance measuring region. There is no large segment difference between the peripheral area of the distance measuring region and the region, where the sub-substrate is located, of the display substrate, so that remarkable stress concentration cannot occur when the display substrate is subsequently aligned and assembled with other substrate.

9 Claims, 6 Drawing Sheets

(51) Int. Cl.
 *G02F 1/1337* (2006.01)
 *G02F 1/1339* (2006.01)
(52) U.S. Cl.
 CPC ............... *G02F 1/133514* (2013.01); *G02F 2001/133302* (2013.01); *G02F 2001/133354* (2013.01); *G02F 2001/133357* (2013.01); *G02F 2001/133776* (2013.01)

DISPLAY SUBSTRATE AND MANUFACTURING METHOD THEREOF, AND DISPLAY PANEL

FIELD OF THE INVENTION

The present invention relates to the field of display technology, and particularly to a display substrate and a manufacturing method thereof, and a display panel.

BACKGROUND OF THE INVENTION

Compared with the cathode ray tube (CRT) display, a liquid crystal display (LCD) has many advantages such as small thickness, low power consumption and the like. Therefore, the CRT displays have been replaced by the LCDs in many fields.

A conventional thin film transistor display panel (TFT-LCD) comprises an array substrate (Array), a color filter substrate (CF) and a liquid crystal layer filled between the Array substrate and the CF substrate. Black matrixes (BMs), a color filter layer (B, G and R color filter), a planarization layer (OC) and spacers (PSs) are sequentially formed on the CF substrate, and manufacturing processes for each layer include a coating process, an exposure process and a development process.

Since a common exposure method is a proximity exposure method, it is required to measure a distance between the mask plate and the glass substrate. FIG. 1 is a structural diagram of a system for measuring the distance between the mask plate and the glass substrate in the prior art, as shown in FIG. 1, the system comprises a semiconductor laser 61, a polarizer 62, a mirror 63, a mask plate 64, a glass substrate 65 and a linear sensor 66. A laser emitted from the semiconductor laser 61 passes through the polarizer 62 so that its light path is adjusted, and then the emitted light beam irradiates onto the mirror 63, the light beam reflected by the mirror 63 passes through the distance measuring window 641 of the mask plate 64 to be incident on the A1 point on the upper surface of the glass substrate 65, the linear sensor 66 receives intensity information of a light beam refracted from the A point on the lower surface of the distance measuring window 641 of the mask plate 64 and of the light reflected from the A1 point on the upper surface of the glass substrate 65, and the intensity information is converted into voltage signals by a AD converter circuit, so that the intensity information of lights at points A1 and A may be expressed. The distance between the mask plate 64 and the glass substrate 65, that is, the distance between the point A1 and the point A, may be measured by analyzing the received voltage signals and obtaining the difference between timings at which these voltage signals are received.

In order to ensure the accuracy of the measured distance data between the mask plate 64 and the glass substrate 65 prior to every exposure, it is required that no other layer exists at the distance measuring window 641 except the black matrix, therefore, the distance measuring window 641 and a peripheral area thereof need to be shielded by using a light shielding plate before layers coated after the black matrix are exposed, so as to prevent the photoresist for the subsequent layers from being cured due to the exposure. In addition, if there is a layer in the shielded peripheral area of the distance measuring window 641, then incomplete exposure at a border area between the shielded region and the unshielded region due to the shielding may easily occur during the exposure, so that debris contamination may be produced in the subsequent development process. Therefore, large blank regions 7 may exist at regions on the motherboard of color filter substrates near the distance measuring windows 641, as shown in FIG. 2.

As shown in FIG. 3, since there are blank regions 7 near the distance measuring windows 641 on the motherboard of the color filter substrates, on the motherboard of the color filter substrates, a segment difference may be caused between the blank region 7 and other nonblank regions, which may cause stress to be concentrated on the aligned and assembled substrates to generate Newton's ring during subsequently aligning and assembling the motherboard of the color filter substrates and the motherboard of the array substrates under vacuum condition, causing the aligned and assembled substrates to distort and the cell thickness is abnormal, thus non-uniformity in the image display may occur when lighting, and local yellowness may occur in a same grey scale.

SUMMARY OF THE INVENTION

In view of the above problems in the prior art, the present invention provides a display substrate and a manufacturing method thereof and a display panel. There is no large segment difference between the peripheral area of the distance measuring region and the region, where the sub-substrate is located, of the display substrate, so that remarkable stress concentration cannot occur when the display substrate is subsequently aligned and assembled with other substrate, large distortion of the display substrate during the alignment and assembling can be avoided, and thus the abnormity of the cell thickness after the alignment and assembling can be avoided, so that the local yellowness phenomenon cannot occur when the aligned and assembled display panel displays.

The present invention provides a display substrate, comprising a plurality of sub-substrates, wherein distance measuring regions are provided on a base in space regions between the sub-substrates, the distance measuring region is configured to measure a distance between a mask plate and the base before forming each layer in the sub-substrates by using an exposure process, wherein
a peripheral area of the distance measuring region is provided therein with a supporting layer on the base, the peripheral area is located in the space region and around the distance measuring region.

Preferably, a thickness of the supporting layer is equal to a total thickness of all layers formed on the base in the sub-substrate.

Preferably, the layers in the sub-substrate comprise a black matrix, a color filter layer, a planarization layer and spacers, the supporting layer comprises the black matrixes, the color filter layer, the planarization layer and the spacers extending to the peripheral area from a region where the sub-substrate is located, and a pattern of each of the layers in the supporting layer is identical to that of a same layer in the sub-substrate.

Preferably, the supporting layer is a cured photoresist layer.

Preferably, the supporting layer is a cured sealant layer.

Preferably, the supporting layer is at least provided at one side of the peripheral area close to the sub-substrate.

The present invention further provides a display panel comprising the above display substrate.

The present invention further provides a manufacturing method of any above display substrate, comprising forming layers in the sub-substrates, and forming distance measuring regions on a base in space regions between adjacent sub-substrates, wherein the manufacturing method further comprises:

forming a supporting layer on the base in the peripheral area of the distance measuring region so that the peripheral area is located in the space region and around the distance measuring region, and shielding the peripheral area and the distance measuring region during forming each layer in the sub-substrate by using an exposure process.

Preferably, forming the layers in the sub-substrate comprises: forming black matrixes, a color filter layer, a planarization layer and spacers on a part of the base corresponding to the sub-substrate so that the black matrixes, the color filter layer, the planarization layer and the spacers extend to the peripheral area to form the supporting layer, which specifically comprises:

Step S1, coating a black matrix film layer on the overall base of the display substrate;

Step S2, shielding a part of the black matrix film layer corresponding to the distance measuring region and the peripheral area;

Step S3. exposing an unshielded part of the black matrix film layer by using a mask plate including a pattern of the black matrixes:

Step S4, removing shelter for shielding the distance measuring region and the peripheral area;

Step S5, exposing the black matrix film layer in the distance measuring region and the peripheral area by using a laser printing apparatus;

Step S6, developing the black matrix film layer subjected to the exposure to finally form the black matrixes in the sub-substrate and the black matrixes in the peripheral area, and meanwhile maintaining the black matrix film layer in the distance measuring region;

forming the color filter layer, the planarization layer and the spacers in the sub-substrate and in the peripheral area on the base formed with the black matrixes by the same steps as those for forming the black matrixes, and removing the color filter layer, the planarization layer and the spacers in the distance measuring region.

Preferably, forming the layers in the sub-substrate comprises: sequentially forming the layers on a part of the base corresponding to the sub-substrate by using patterning processes without forming any layer on a part of the base corresponding to the peripheral area and forming the supporting layer on the base in the peripheral area of the distance measuring region comprises: coating a photoresist layer on the base subjected to the above steps, exposing and developing the photoresist layer, remaining the photoresist in the peripheral area and removing the photoresist in regions other than the peripheral region.

Preferably, forming the layers in the sub-substrate comprises: sequentially forming the layers in the sub-substrate on the base by using a patterning process without forming any layer on the base corresponding to the peripheral area; and forming the supporting layer on the base in the peripheral area of the distance measuring region comprises: coating a sealant on the base in the peripheral area, and curing the sealant.

The present invention has the following advantages: in the display substrate provided in the present invention, by providing the supporting layer in the peripheral area of the distance measuring region, there is no large segment difference between the peripheral area of the distance measuring region and the region, where the sub-substrate is located, of the display substrate, so that remarkable stress concentration cannot occur when the display substrate is subsequently aligned and assembled with other substrate, large distortion of the display substrate during the alignment and assembling can be avoided, and thus the abnormity of the cell thickness after the alignment and assembling can be avoided, so that the local yellowness phenomenon cannot occur when the aligned and assembled display panel displays.

In the display panel provided in the present invention, by adopting the above display substrate, no stress concentration occurs in the display panel, so that the display panel cannot be distorted, and thus the local yellowness phenomenon cannot occur when the display panel displays.

DESCRIPTION OF NUMERALS 1. sub-substrate; 2. space region; 3. distance measuring region; 4. peripheral area; 5. supporting layer; 51. black matrix; 52. color filter layer; 53. planarization layer; 54. spacer; 61. semiconductor laser; 62. polarizer; 63. mirror; 64. mask plate; 641. distance measuring window; 65. glass substrate; 66. linear sensor; 7. blank region.

DETAILED DESCRIPTION OF THE EMBODIMENTS

In order to make a person skilled in the art better understand the solutions of the present invention, a display substrate and a manufacturing method thereof and a display panel provided in the present invention will be described in details below in conjunction with drawings and embodiments.

First Embodiment

Figure 1:
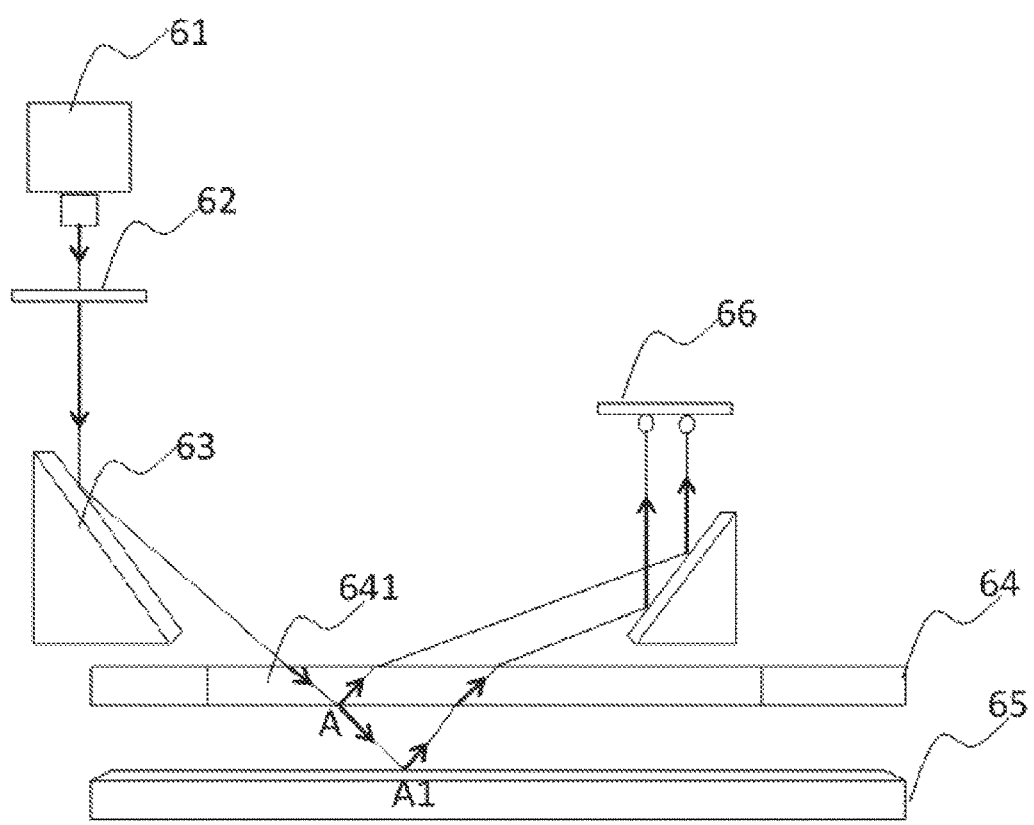
FIG. 1 is a structural diagram of a system for measuring the distance between the mask plate and the glass substrate in the prior art.
Figure 2:
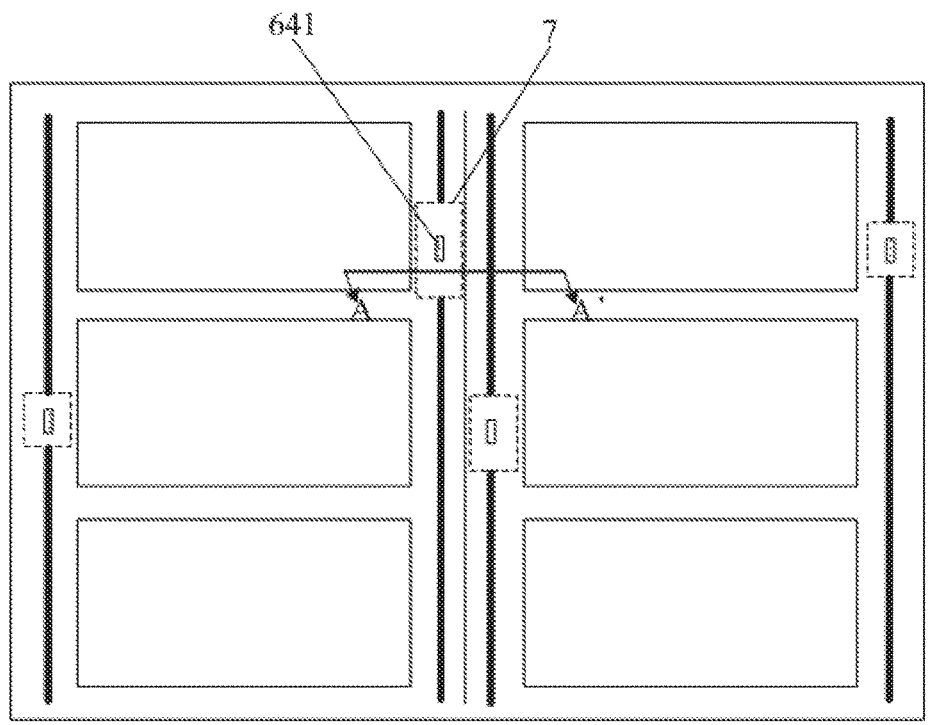
FIG. 2 is a top structural view of a motherboard of the color filter substrates in the prior art.
Figure 3:
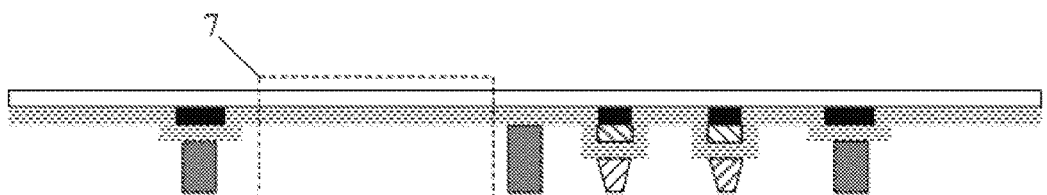
FIG. 3 is a cross sectional diagram of the motherboard of the color filter substrates in FIG. 2 taken along a sectional line AA'.
Figure 4:
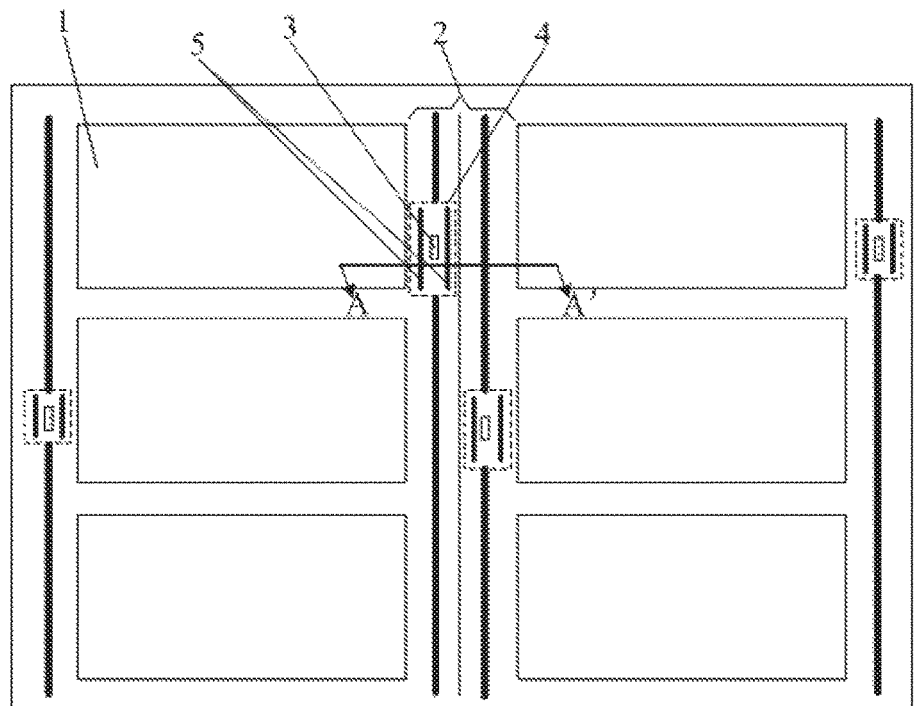
FIG. 4 is a top structural diagram of a display substrate in a first embodiment of the present invention.
Figure 5:
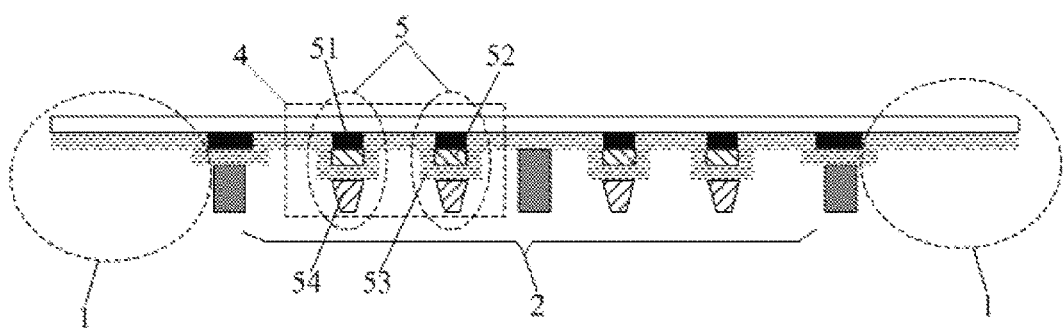
FIG. 5 is a cross sectional diagram of the display substrate in FIG. 4 taken along a sectional line AA'.

The embodiment provides a display substrate, as shown in FIG. 4 and FIG. 5, the display substrate comprises a plurality of sub-substrates 1, distance measuring regions 3 are provided on a base in space regions 2 between the sub-substrates 1, the distance measuring region 3 is used to measure a distance between a mask plate and the base before forming each layer in the sub-substrates by using an exposure process, a peripheral area 4 of the distance measuring region 3 is provided therein with a supporting layer 5 on the base, the peripheral area 4 is located in the space region 2 and around the distance measuring region 3, and the peripheral area 4 and the distance measuring region 3 are shielded during the layers in the sub-substrates 1 are formed by using exposure processes.

By providing the supporting layer 5 in the peripheral area 4 of the distance measuring region 3, there is no large segment difference between the peripheral area 4 of the distance measuring region 3 and the region, where the sub-substrate 1 is located, of the display substrate, so that remarkable stress concentration cannot occur when the display substrate is subsequently aligned and assembled with other substrate, large distortion of the display substrate during the alignment and assembling can be avoided, and thus the abnormality of the cell thickness after the alignment and assembling can be avoided, so that the local yellowness phenomenon cannot occur when the aligned and assembled display panel displays.

A thickness of the supporting layer 5 is equal to a total thickness of all layers in the sub-substrate 1. With such an arrangement, there is no segment difference between the peripheral area 4 of the distance measuring region 3 and the region, where the sub-substrate 1 is located, of the display substrate, so that stress concentration cannot occur when the display substrate is subsequently aligned and assembled with other substrate, distortion of the display substrate during the alignment and assembling can be avoided, and thus the abnormality of the cell thickness after the alignment and assembling can be avoided, so that the local yellowness phenomenon cannot occur when the aligned and assembled display panel displays.

In the present embodiment, the layers in the sub-substrate 1 comprise black matrixes, a color filter layer, a planarization layer and spacers, the supporting layer 5 comprises black matrixes 51, the color filter layer 52, the planarization layer 53 and the spacers 54 extending to the peripheral area 4 from a region where the sub-substrate 1 is located, and a pattern of each of the layers in the supporting layer 5 is identical to that of a same layer in the sub-substrate 1. That is, the pattern of the black matrixes 51 in the supporting layer 5 is identical to that of the black matrixes in the sub-substrate 1, the pattern of the color filter layer 52 in the supporting layer 5 is identical to that of the color filter layer in the sub-substrate 1, the same is true for the planarization layer 53 and the spacers 54. With such an arrangement, the layers constituting the supporting layer 5 in the peripheral area 4 and the layers in the sub-substrate 1 may be formed by coating and development once, so that manufacture of the supporting layer 5 does not add any additional coating and development process to the manufacturing process of the display substrate. At the same time, such an arrangement enables the thickness of the supporting layer 5 to be equal to the total thickness of all layers in the sub-substrate 1, so that a segment difference is prevented from being formed between the peripheral area 4 of the distance measuring region 3 and the region where the sub-substrate 1 is located, of the display substrate.

The display substrate in this embodiment is a motherboard of the color filter substrates, by providing the distance measuring regions 3, positions of the layers on the motherboard of the color filter substrates may be accurately aligned when the layers are formed, and formation of patterns of the layers can be ensured to be accurate.

In this embodiment, the supporting layer 5 is at least provided at one side of the peripheral area 4 close to the sub-substrate 1. With this arrangement, after the display substrate is aligned and assembled with other substrate, since the supporting layer 5 is close to edges of the sub-substrate 1, and the region where the sub-substrate 1 is located is a display area, the supporting layer 5 may properly support the edges of the display area, so that distortion of the display area of the display panel formed by alignment and assembling due to stress concentration can be avoided, and thus it can be ensured that the abnormality of the cell thickness in the display area cannot occur, so that the local yellowness phenomenon can be avoided when the aligned and assembled display panel displays.

It should be noted that, the supporting layer 5 may be arranged throughout the overall peripheral area 4, or may be only arranged in a part of the peripheral area 4. The yellowness phenomenon can be prevented or avoided when the display substrate, which is aligned and assembled with other substrate, displays, so long as the supporting layer 5 is at least provided at one side of the peripheral area 4 close to the sub-substrate 1.

On the basis of the above structure of the display substrate, the present embodiment further provides a manufacturing method of the above display substrate, comprising forming the layers in the sub-substrate 1, and forming distance measuring regions 3 on a base in space regions 2 between adjacent sub-substrates 1, and further comprising:

forming the supporting layer 5 on the base in the peripheral area 4 of the distance measuring region 3, wherein the peripheral area 4 is located in the space region 2 and around the distance measuring region 3, and the peripheral area 4 and the distance measuring region 3 are shielded during forming the layers in the sub-substrate 1 by using exposure processes.

In the present embodiment, forming the layers in the sub-substrate 1 comprises: forming black matrixes, a color filter layer, a planarization layer and spacers on a part of the base corresponding to the sub-substrate 1 so that the black matrixes 51, the color filter layer 52, the planarization layer 53 and the spacers 54 extend to the peripheral area 4 to form the supporting layer 5, which specifically comprises:

Step S1, coating a black matrix film layer on the overall base of the display substrate.

In this step, the black matrix film layer covers regions where the substrates 1 are to be formed and regions outside the sub-substrates 1.

Step S2, shielding a part of the black matrix film layer corresponding to the distance measuring region 3 and the peripheral area 4.

With thus arrangement, the accuracy of measuring the distance between the mask plate and the distance region 3 during exposing the subsequent layers may be prevented from being influenced due to curing of the black matrix photoresist correspondingly distributed at the peripheral region 4 after the exposure.

Step S3, exposing the non-shielded black matrix film layer by using a mask plate including a pattern of the black matrixes.

After this step, a part of the black matrix film layer corresponding to the region for forming the sub-substrate 1 and parts of the black matrix film layer corresponding to the regions outside the sub-substrate 1, the distance measuring region 3 and the peripheral area 4 are exposed to form the pattern of the black matrixes, and a part of the black matrix film layer in the distance measuring region 3 and the peripheral area 4 is not exposed.

Step S4, removing shelter for shielding the distance measuring region 3 and the peripheral area 4.

Step S5, exposing the part of the black matrix film layer in the distance measuring region 3 and the peripheral area 4 by using a laser printing apparatus.

The laser printing apparatus forms the pattern of the black matrixes with exposure by directly irradiating a laser beam for forming the pattern of the black matrixes onto the black matrix film layer so that a chemical reaction is generated in the black matrix film layer. The black matrix film layer in the whole peripheral area 4 can be exposed by controlling effective displacement of the laser beam. After this step, the pattern of the black matrixes is formed on the black matrix film layer in the peripheral area 4, and the overall black matrix film layer in the distance measuring region 3 is exposed.

Step S6, developing the black matrix film layer subjected to the exposure to finally form the black matrixes in the sub-substrate 1 and the black matrixes 51 in the peripheral area 4, and meanwhile remaining the black matrix film layer in the distance measuring region 3.

In this step, since the black matrix photoresist is a negative photoresist, the exposed part of the black matrix film layer is remained, and the part not being exposed of the black matrix film layer is then removed after the development. The black matrix film layer in the distance measuring region 3 is remained, since the black matrix film layer can reflect light, measurement of the distance between the mask plate and the distance measuring region 3 during manufacturing the subsequent layers can be realized using the reflecting principle and the distance measuring principle in the prior art, so it is required to remain the black matrix film layer in the distance measuring region 3.

The color filter layer 52, the planarization layer 53 and the spacers 54 are sequentially formed in the sub-substrate 1 and in the peripheral area 4 on the base formed with the black matrixes 51 by the same steps as those for forming the black matrixes 51, and the color filter layer 52, the planarization layer 53 and the spacers 54 in the distance measuring region 3 are removed. That is to say, the steps for manufacturing the color filter layer 52, the planarization layer 53 and the spacers 54 in the peripheral area 4 are the same as the above steps for manufacturing the black matrixes 51 respectively, the unique difference therebetween is in that: when the layers subsequently formed in the peripheral area 4 and the distance measuring region 3 are exposed using the laser printing apparatus, the layers subsequently formed in the distance measuring region 3 (that is, the color filter layer 52, the planarization layer 53 and the spacers 54) must be removed after the exposure and the development, so as to avoid the case in which the distance measuring region 3 is shielded by the respective layers after they are manufactured individually, so that the distance between the mask plate and the base (an upper surface of the black matrix film layver in the distance measuring region 3 in the present embodiment) can be measured before the further subsequently manufactured layer is exposed.

In the manufacturing method of the display substrate, each of the layers in the supporting layer 5 in the peripheral area 4 and a same layer in a corresponding region of the sub-substrate 1 may be formed by a single coating process and a single development process, so that the manufacture of the layers in the supporting layer 5 in the peripheral area 4 does not add any additional coating process and development process to the manufacture process of the display substrate, and thus is simple.

In the present embodiment, since the black matrixes, the color filter layer, the planarization layer and the spacers in the corresponding region of the sub-substrate 1 and the black matrixes 51, the color filter layer 52, the planarization layer 53 and the spacers 54 in the peripheral area 4 are formed though a single patterning process respectively, after the exposure and the development, a total thickness of the supporting layer 5 in the peripheral area 4 is equal to a total thickness of all layers in the sub-substrate 1.

It should be noted that, the display substrate in the present embodiment may also be a motherboard of the array substrates.

Second Embodiment

Figure 6:
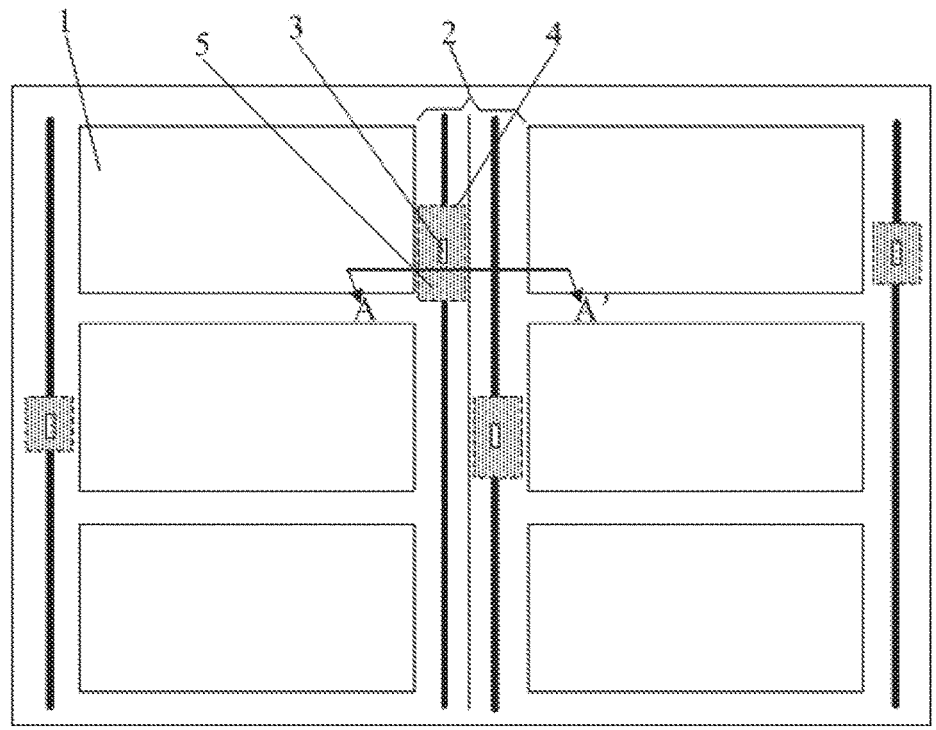
FIG. 6 is a top structural diagram of a display substrate in a second embodiment of the present invention.
Figure 7:
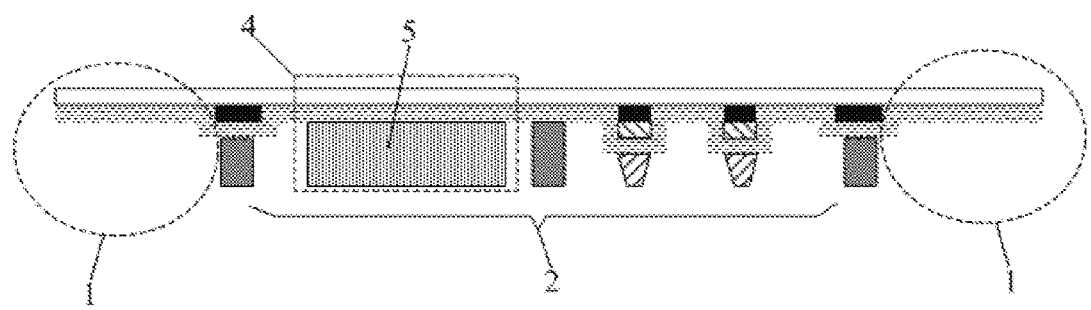
FIG. 7 is a cross sectional diagram of the display substrate in FIG. 6 taken along a sectional line AA'.

The present embodiment provides a display substrate, unlike the first embodiment, as shown in FIG. 6 and FIG. 7, the supporting layer 5 is a cured photoresist layer.

Accordingly, a manufacturing method of the display substrate in the present embodiment comprises the following steps: first, sequentially forming the layers in the sub-substrate 1 on the base by using patterning processes without forming any layer on a part of the base corresponding to the peripheral area 4; then, coating a photoresist layer on the base subjected to the above step, exposing and developing the photoresist layer, and remaining the photoresist in the peripheral area 4 and removing the photoresist in regions outside the peripheral region 4. Finally, the photoresist in the peripheral area 4 is heated and cured, wherein the heating temperature is generally 100-200° C. The exposure for the photoresist layer may be performed by adopting a conventional ultraviolet exposure process by means of a mask plate, or may be performed by using a laser printing apparatus to directly print.

It should be noted that, a thickness of the coated photoresist layer is equal to a total thickness of all layers in the sub-substrate 1, after the exposure and the development, a total thickness of the supporting layer 5 in the peripheral area 4 is equal to the total thickness of all layers in the sub-substrate 1.

Other structures and manufacturing method of the display substrate in the present embodiment are identical to those in the first embodiment, which will not be repeated herein.

Third Embodiment

Figure 8:
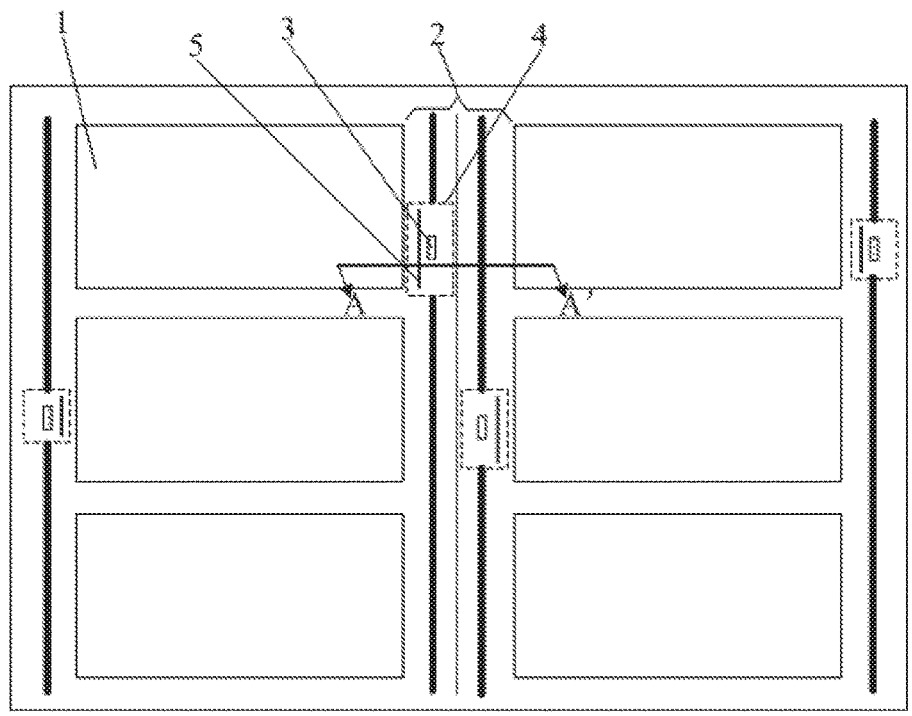
FIG. 8 is a top structural diagram of a display substrate in a third embodiment of the present invention.
Figure 9:
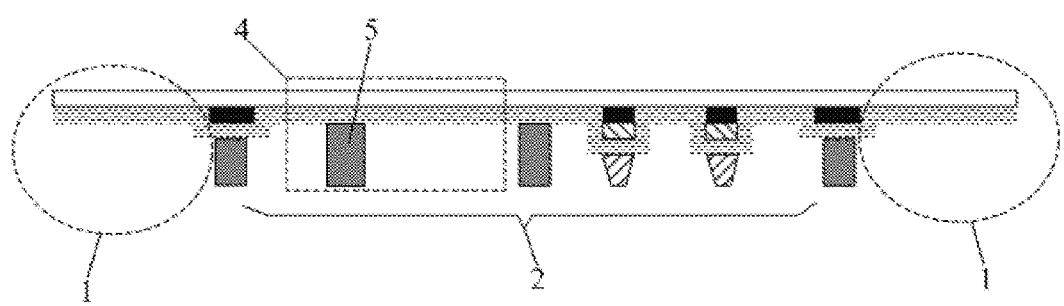
FIG. 9 is a cross sectional diagram of the display substrate in FIG. 8 taken along a sectional line AA'.

The present embodiment provides a display substrate, unlike the first and second embodiments, as shown in FIG. 8 and FIG. 9, the supporting layer 5 is a cured sealant layer.

Accordingly, a manufacturing method of the display substrate in the present embodiment comprises the following step: first, sequentially forming layers in the sub-substrate 1 on a base by using patterning processes without forming any layer on a part of the base corresponding to the peripheral area 4; then, coating sealant on the base in the peripheral area 4, and curing the sealant.

Figure 10:
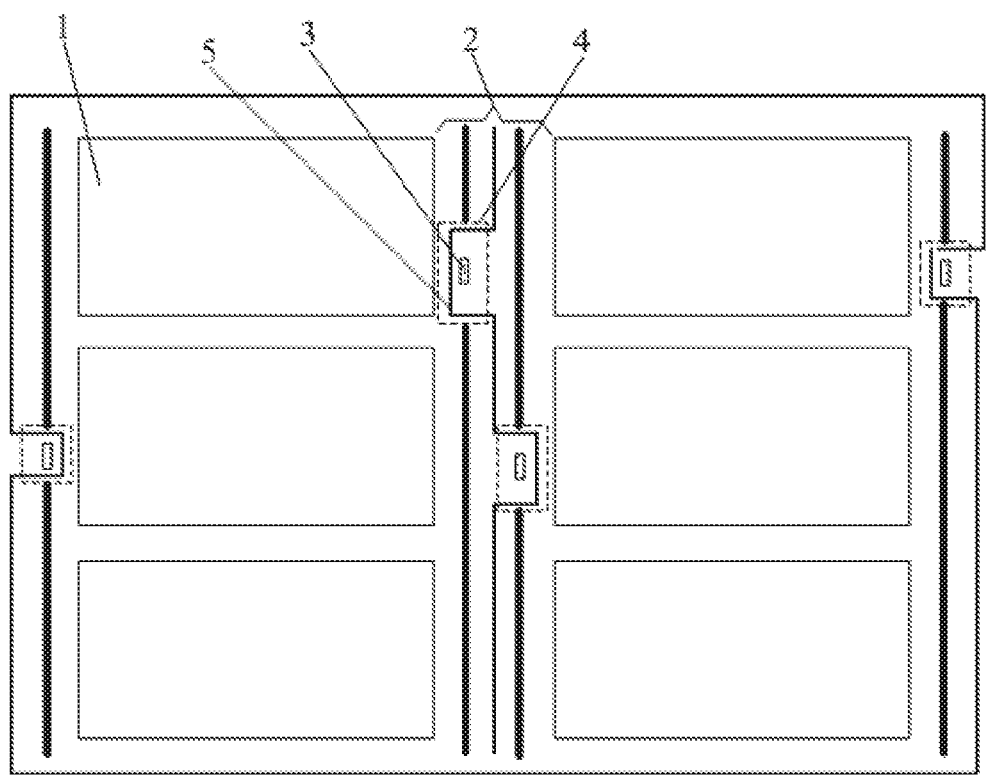
FIG. 10 is another top structural diagram of a display substrate in the third embodiment of the present invention.

The sealant in the peripheral area 4 may be disconnected with the sealant in other regions on the display substrate (as shown in FIG. 8), the sealant in the peripheral area 4 may also be connected with the sealant in other regions on the display substrate (as shown in FIG. 10), which may be realized by discontinuously or continuously coating the sealant during the coating process.

It should be noted that, the display substrate coated with the sealant is aligned and assembled with another substrate, and a thickness of the cured sealant is equal to a total thickness of all layers in the sub-substrate 1.

Other structures and manufacturing method of the display substrate in the present embodiment are identical to those in the first embodiment, which will not be repeated herein.

The first to third embodiments have the following advantages: in the display substrate provided in the first to third embodiments, by providing the supporting layer in the peripheral area of the distance measuring region, there is no large segment difference between the peripheral area of the distance measuring region and the region, where the sub-substrate is located, of the display substrate, so that remarkable stress concentration cannot occur when the display substrate is subsequently aligned and assembled with other substrate, large distortion of the display substrate during the alignment and assembling can be avoided, and thus the abnormity of the cell thickness after the alignment and assembling can be avoided, so that the local yellowness phenomenon cannot occur when the aligned and assembled display panel displays.

Fourth Embodiment

The present embodiment provides a display panel, which comprises the display substrate in any one of the first to third embodiments.

By adopting the display substrate in any one of the first to third embodiments, no stress concentration occurs in the display panel, so that the display panel cannot be distorted, and thus the local yellowness phenomenon cannot occur when the display panel displays.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall fall into the protection scope of the present invention.

The invention claimed is:

1. A display substrate, comprising a plurality of sub-substrates, wherein distance measuring regions are provided on a base in space regions between the sub-substrates, the distance measuring region is configured to measure a distance between a mask plate and the base before forming each layer in the sub-substrates by using an exposure process, wherein
 a peripheral area of the distance measuring region is provided therein with a supporting layer on the base, and the peripheral area is located in the space region and around the distance measuring region, and
 wherein the layers in the sub-substrates comprise black matrixes, a color filter layer, a planarization layer and spacers, the supporting layer comprises the black matrixes, the color filter layer, the planarization layer and the spacers extending to the peripheral area from a region where the sub-substrates are located, and a pattern of each of the layers in the supporting layer is substantially identical to that of a same layer in the sub-substrates, and
 the distance measuring region is only provided therein with the black matrixes.

2. The display substrate of claim 1, wherein a thickness of the supporting layer is equal to a total thickness of all layers formed on the base in the sub-substrate.

3. The display substrate of claim 2, wherein the supporting layer is at least provided at one side of the peripheral area close to the sub-substrate.

4. A display panel comprising the display substrate of claim 2.

5. The display substrate of claim 1, wherein the supporting layer is at least provided at one side of the peripheral area close to the sub-substrate.

6. A display panel comprising the display substrate of claim 1.

7. A manufacturing method of the display substrate of claim 1, comprising forming layers in the sub-substrates, and forming distance measuring regions on a base in space regions between adjacent sub-substrates, wherein the manufacturing method further comprises:
 forming a supporting layer on the base in the peripheral area of the distance measuring region so that the peripheral area is located in the space region and around the distance measuring region, and shielding the peripheral area and the distance measuring region during forming each layer in the sub-substrate by using an exposure process, wherein
 forming layers in the sub-substrates comprises: forming black matrixes, a color filter layer, a planarization layer and spacers on a part of the base corresponding to the sub-substrates so that the black matrixes, the color filter layer, the planarization layer and the spacers extend to the peripheral area to form the supporting layer,
 wherein the distance measuring region is only formed therein with the black matrixes.

8. The manufacturing method of claim 7, wherein a thickness of the supporting layer is equal to a total thickness of all layers formed on the base in the sub-substrate.

9. The manufacturing method of claim 7, wherein forming layers in the sub-substrate specifically comprises:
 Step S1, coating a black matrix film layer on the overall base of the display substrate;
 Step S2, shielding a part of the black matrix film layer corresponding to the distance measuring region and the peripheral area;
 Step S3, exposing an unshielded part of the black matrix film layer by using a mask plate including a pattern of the black matrixes;
 Step S4, removing shelter for shielding the distance measuring region and the peripheral area;
 Step S5, exposing the part of the black matrix film layer in the distance measuring region and the peripheral area by using a laser printing apparatus;
 Step S6, developing the black matrix film layer subjected to the exposure to finally form the black matrixes in the sub-substrate and the black matrixes in the peripheral area, and meanwhile remaining the black matrix film layer in the distance measuring region;
 forming the color filter layer, the planarization layer and the spacers in the sub-substrate and in the peripheral area on the base formed with the black matrixes by the same steps as those for forming the black matrixes, and removing the color filter layer, the planarization layer and the spacers in the distance measuring region.

* * * * *